United States Patent
Petersson et al.

(10) Patent No.: US 10,341,962 B2
(45) Date of Patent: Jul. 2, 2019

(54) METHODS AND APPARATUS FOR SIGNAL TRANSMISSION AND RECEPTION IN A WIRELESS COMMUNICATION NETWORK

(71) Applicant: Telefonaktiebolaget LM Ericsson (publ), Stockholm (SE)

(72) Inventors: Sven Petersson, Sävedalen (SE); Fredrik Athley, Kullavik (SE); Andreas Nilsson, Göteborg (SE); Andres Reial, Malmö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 22 days.

(21) Appl. No.: 15/520,005

(22) PCT Filed: Apr. 10, 2017

(86) PCT No.: PCT/EP2017/058550
§ 371 (c)(1),
(2) Date: Apr. 18, 2017

(87) PCT Pub. No.: WO2018/188723
PCT Pub. Date: Oct. 18, 2018

(65) Prior Publication Data
US 2018/0302863 A1    Oct. 18, 2018

(51) Int. Cl.
*H04W 52/24*    (2009.01)
*H04W 52/32*    (2009.01)
(Continued)

(52) U.S. Cl.
CPC ........ *H04W 52/245* (2013.01); *H04B 7/0684* (2013.01); *H04B 17/318* (2015.01);
(Continued)

(58) Field of Classification Search
None
See application file for complete search history.

(56) References Cited

U.S. PATENT DOCUMENTS

| | | | |
|---|---|---|---|
| 8,737,301 B2 * | 5/2014 | Von Elbwart | H04L 1/003 370/328 |
| 2010/0046402 A1 | 2/2010 | Forck et al. | |

(Continued)

OTHER PUBLICATIONS

3GPP, "3GPP TS 36.211 V14.1.0 (Dec. 2016)", 3rd Generation Partnership Project; Technical Specification Group Radio Access Network; Evolved Universal Terrestrial Radio Access (E-UTRA); Physical channels and modulation (Release 14), Dec. 2016, pp. 1-175.

*Primary Examiner* — Mohammed Rachedine
(74) *Attorney, Agent, or Firm* — Murphy, Bilak & Homiller, PLLC

(57) ABSTRACT

A wireless device (12) is configured to transmit a signal simultaneously from a group (104) of physical antenna ports (106), based on associating disjoint frequency sub-bands with respective ones of the physical antenna ports (106). The frequency sub-bands collectively span a frequency bandwidth and each physical antenna port (106) supports transmission over the frequency bandwidth and has a per-port transmit power associated therewith. The wireless device (12) is configured to transmit the signal further based on allocating the per-port transmit power of each physical antenna port (106) in the group (104) only to frequency elements of the signal that fall within the frequency sub-band associated with the physical antenna port (106). A radio network node (10) in a network (16) is configured to perform channel estimation based on receiving a reference signal from the wireless device (12) and its channel estimation accounts for channel changes that may appear at the border between two frequency sub-bands.

30 Claims, 6 Drawing Sheets

(51) Int. Cl.
*H04W 52/42* (2009.01)
*H04W 72/04* (2009.01)
*H04L 5/00* (2006.01)
*H04L 25/02* (2006.01)
*H04B 17/318* (2015.01)
*H04B 7/06* (2006.01)
*H04W 72/08* (2009.01)

(52) U.S. Cl.
CPC .......... *H04L 5/0048* (2013.01); *H04L 5/0053* (2013.01); *H04L 25/0202* (2013.01); *H04W 52/241* (2013.01); *H04W 52/327* (2013.01); *H04W 52/42* (2013.01); *H04W 72/08* (2013.01); *H04W 72/0473* (2013.01)

(56) References Cited

U.S. PATENT DOCUMENTS

| | | |
|---|---|---|
| 2011/0081934 A1 | 4/2011 | Imamura et al. |
| 2011/0243007 A1 | 10/2011 | Xiao et al. |
| 2012/0014349 A1 | 1/2012 | Chung et al. |
| 2012/0182857 A1 | 7/2012 | Bertrand et al. |
| 2013/0279617 A1 | 10/2013 | Xu et al. |
| 2017/0054542 A1 | 2/2017 | Vermani et al. |

* cited by examiner

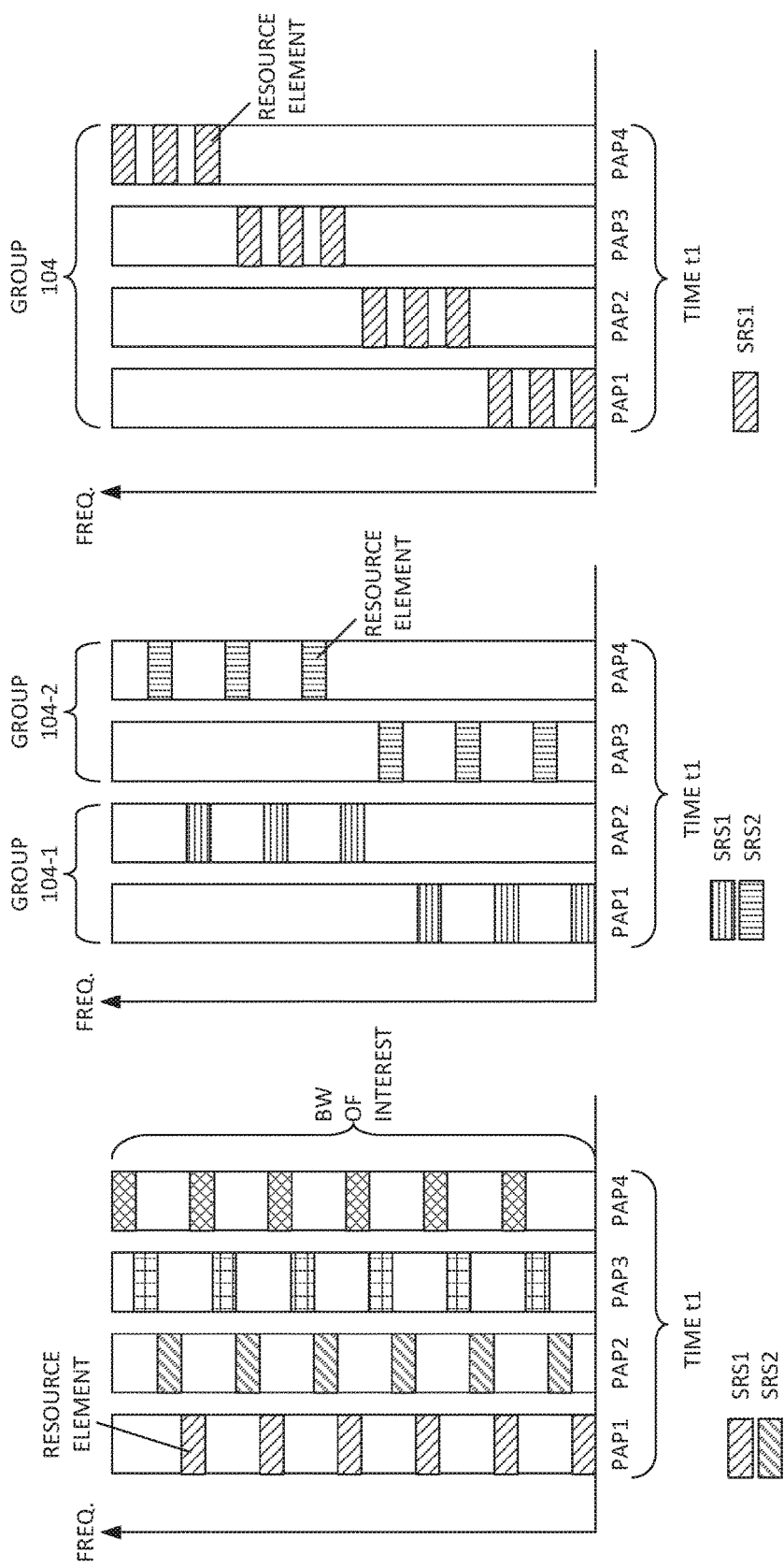

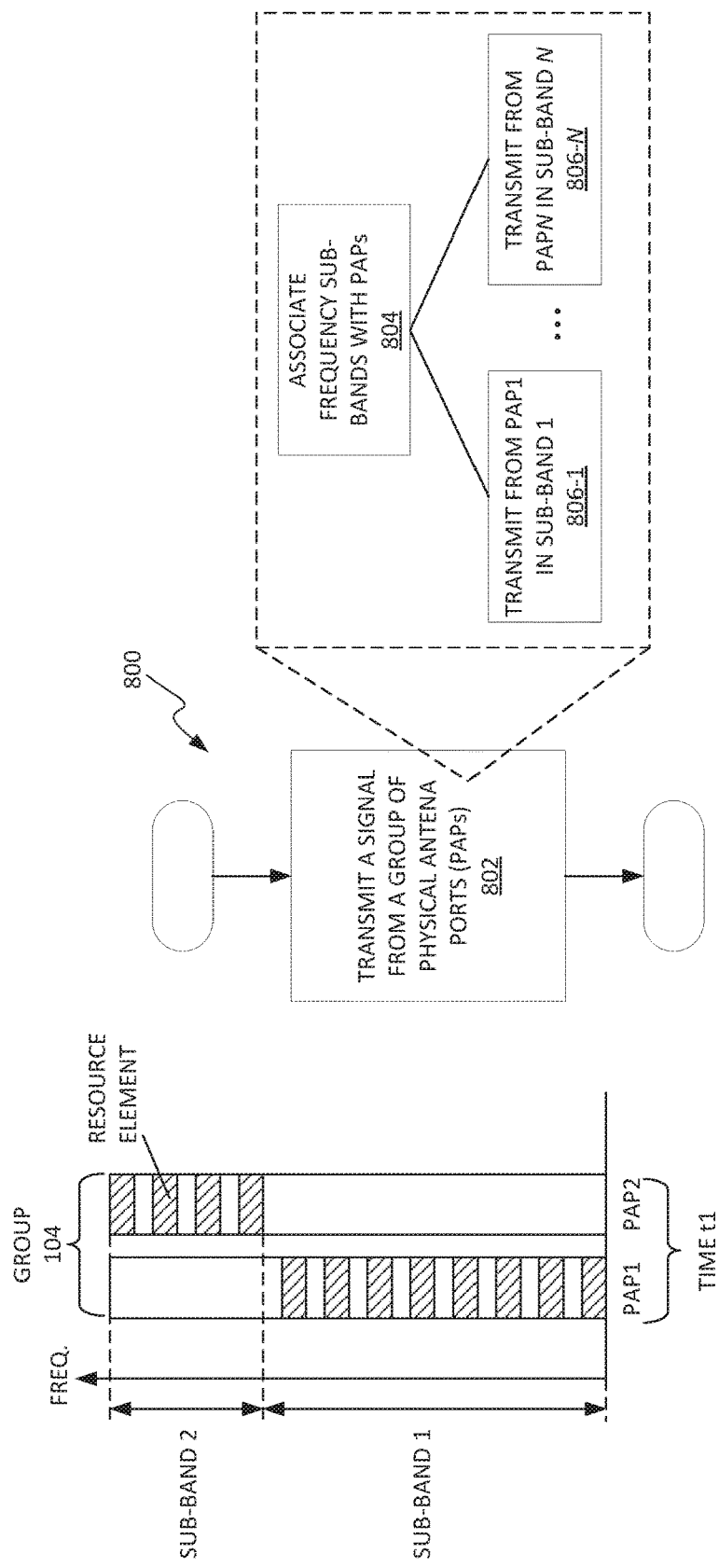

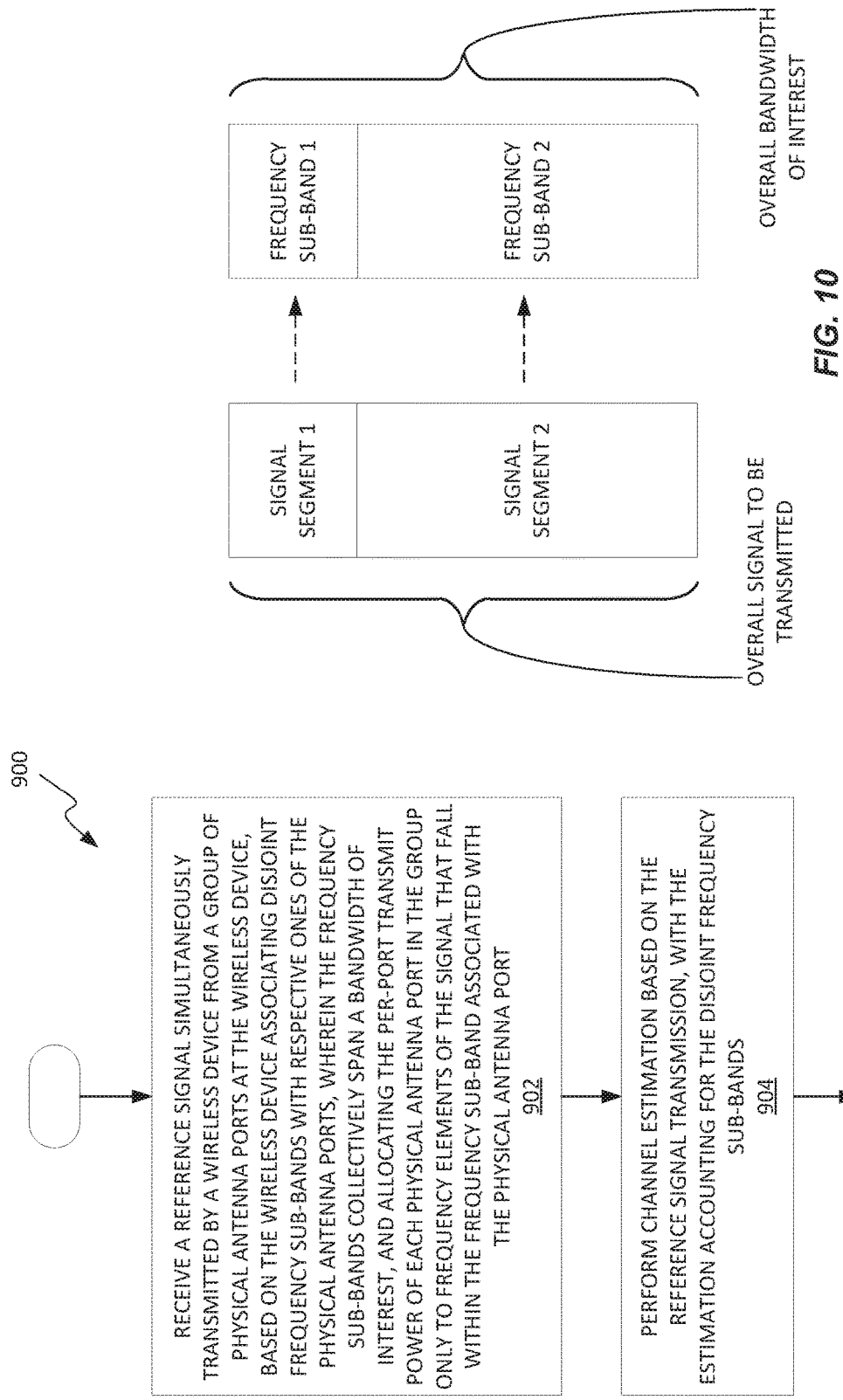

METHODS AND APPARATUS FOR SIGNAL TRANSMISSION AND RECEPTION IN A WIRELESS COMMUNICATION NETWORK

TECHNICAL FIELD

The present invention relates to wireless communication networks and particularly relates to methods and apparatus for signal transmission and reception in such networks.

BACKGROUND

A general problem with multi-antenna uplink transmissions by a User Equipment (UE) or another type of wireless communication device to a radio network is the limited total transmit power over all simultaneously used physical antenna ports, as well as the limited transmit power of each physical antenna port. In case several physical antenna ports are simultaneously active to transmit reference signals, such as Sounding Reference Signals (SRSs), the power per physical antenna port is limited by the overall and per-port power limits. There is thus a risk that the received power spectral density per signal may be too weak, at least under adverse channel conditions. For details regarding SRS, see, for example, Section 5.5.3 of the Third Generation Partnership Project (3GPP) Technical Specification, TS 36.211 V141.1.0 (2016-12).

To overcome the above problem, the wireless device may, in some cases, beamform its reference signal transmission over multiple physical antenna ports to improve link gain by potentially both beamforming gain and increased output power for the transmission. Most likely the number of reference signals will be less than the number of antenna ports in such cases, because the reference signals are likely to not share the same power amplifiers, for the sake of peak-to-average-power-ratio (PAPR) when transmitting data.

However, beamforming over antenna ports is not always an option, or at least may not be desirable. For example, consider a case where the involved antennas are located far away from each other, i.e., typically >0.5 wavelengths of separation. Because of the large separation between antennas, the resulting beams will have many and narrow lobes (grating lobes), which may make it difficult to transmit reference signals in the desired direction. Other beamforming complications may arise from unknown phase relations between the different antennas used for the transmission.

SUMMARY

It is desirable to provide measures which may enable, in an efficient and easy manner, a radio network node to receive signals from a wireless device at sufficiently high power spectral densities, e.g., for reliable channel estimation.

Example methods and apparatus disclosed herein may involve a wireless device performing a signal transmission in which the wireless device transmits simultaneously from two or more physical antenna ports while restricting the transmission from each physical antenna port to only a disjoint frequency sub-band of a frequency bandwidth. Further, the example methods and apparatus may involve a radio network node receiving a signal transmitted in such manner.

As an example advantage, performing simultaneous transmission from the two or more physical antenna ports in disjoint frequency sub-bands avoids beamforming for the signal transmission, which may be undesirable at least for certain antenna configurations. As another example advantage, using the available output power of each physical antenna port over less than the frequency bandwidth allows the wireless device to achieve a higher power spectral density for the signal transmitted from each physical antenna port, as compared to what would be achieved if each physical antenna port was used for the full bandwidth. As a further advantage, by performing the sub-band limited transmission from each physical antenna port simultaneously with the sub-band limited transmission from each of the other physical antenna ports in the group, the disjoint transmissions are coincident in time.

In one embodiment, a method of operation at a wireless device configured for operation in a wireless communication network includes transmitting a signal simultaneously from a group of physical antenna ports at the wireless device, based on associating disjoint frequency sub-bands with respective ones of the physical antenna ports. The frequency sub-bands collectively span a frequency bandwidth, and each physical antenna port supports transmission over the frequency bandwidth and has a per-port transmit power associated therewith. The step of transmitting is further performed based on allocating the per-port transmit power of each physical antenna port in the group only to frequency elements of the signal that fall within the frequency sub-band associated with the physical antenna port.

In one or more other embodiments, a wireless device includes communication circuitry configured to transmit and receive signals in a wireless communication network and further includes processing circuitry that is operatively associated with the communication circuitry. The processing circuitry is configured to transmit a signal simultaneously from a group of physical antenna ports provided by the communication circuitry, based on associating disjoint frequency sub-bands with respective ones of the physical antenna ports. The frequency sub-bands collectively span a frequency bandwidth, and each physical antenna port supports transmission over the frequency bandwidth and has a per-port transmit power associated therewith. However, at least for the transmission in question, the processing circuitry is configured transmit the signal based on allocating the per-port transmit power of each physical antenna port in the group only to frequency elements of the signal that fall within the frequency sub-band associated with the physical antenna port.

A wireless device in another example is configured to transmit a signal simultaneously from a group of physical antenna ports at the device, based on associating disjoint frequency sub-bands with respective ones of the physical antenna ports. The frequency sub-bands collectively span a frequency bandwidth, and each physical antenna port supports transmission over the frequency bandwidth and has a per-port transmit power associated therewith. However, the wireless device is configured to transmit the signal based on allocating the per-port transmit power of each physical antenna port in the group only to frequency elements of the signal that fall within the frequency sub-band associated with the physical antenna port.

A wireless device in another example comprises a transmitting module. The transmitting module is configured to transmit a signal simultaneously from a group of physical antenna ports at the device, based on associating disjoint frequency sub-bands with respective ones of the physical antenna ports. The frequency sub-bands collectively span a frequency bandwidth, and each physical antenna port supports transmission over the frequency bandwidth and has a per-port transmit power associated therewith. However, at least for the transmission in question, the transmitting module is configured to transmit the signal based on allocating the per-port transmit power of each physical antenna port in the group only to frequency elements of the signal that fall within the frequency sub-band associated with the physical antenna port.

In another example, a method at a radio network node configured for operation in a wireless communication network includes receiving a reference signal simultaneously transmitted by a wireless device from a group of physical antenna ports at the wireless device, based on the device associating disjoint frequency sub-bands with respective ones of the physical antenna ports. The frequency sub-bands collectively span a frequency bandwidth and each physical antenna port supports transmission over the frequency bandwidth and has a per-port transmit power associated therewith. However, for the reference signal transmission, the device allocates the per-port transmit power of each physical antenna port in the group only to frequency elements of the signal that fall within the frequency sub-band associated with the physical antenna port. Correspondingly, the method at the radio network node further includes performing channel estimation based on the reference signal as received at the radio network node. The channel estimation includes interpolating channel estimates within each frequency sub-band based on the reference signal as received in the frequency sub-band, and, when interpolating, optionally accounting for channel changes that may appear at the border between two frequency sub-bands.

A radio network node in a corresponding example includes communication circuitry configured for transmitting and receiving signals in a wireless communication network, and processing circuitry that is operatively associated with the communication circuitry. The processing circuitry is configured to receive a reference signal simultaneously transmitted by a wireless device from a group of physical antenna ports at the wireless device, based on the device associating disjoint frequency sub-bands with respective ones of the physical antenna ports. The frequency sub-bands collectively span a frequency bandwidth and each physical antenna port supports transmission over the frequency bandwidth and has a per-port transmit power associated therewith. However, for the reference signal transmission, the device allocates the per-port transmit power of each physical antenna port in the group only to frequency elements of the signal that fall within the frequency sub-band associated with the physical antenna port. Correspondingly, the processing circuitry is further configured to perform channel estimation based on the reference signal as received at the radio network node. The channel estimation includes interpolating channel estimates within each frequency sub-band based on the reference signal as received in the frequency sub-band, and, when interpolating, optionally accounting for channel changes that may appear at the border between two frequency sub-bands.

A radio network node in another example is configured to receive a reference signal simultaneously transmitted by a wireless device from a group of physical antenna ports at the wireless device, based on the device associating disjoint frequency sub-bands with respective ones of the physical antenna polls. The frequency sub-bands collectively span a frequency bandwidth, and each physical antenna port supports transmission over the frequency bandwidth and has a per-port transmit power associated therewith. However, for the reference signal transmission, the device allocates the per-port transmit power of each physical antenna port in the group only to frequency elements of the signal that fall within the frequency sub-band associated with the physical antenna port. Correspondingly, the radio network node is further configured to perform channel estimation based on the reference signal as received at the radio network node. The channel estimation includes interpolating channel estimates within each frequency sub-band based on the reference signal as received in the frequency sub-band, and, when interpolating, optionally accounting for channel changes that may appear at the border between two frequency sub-bands.

A radio network node of another example comprises a performance module. The performance module is configured to receive a reference signal simultaneously transmitted by a wireless device from a group of physical antenna ports at the wireless device, based on the device associating disjoint frequency sub-bands with respective ones of the physical antenna ports. The frequency sub-bands collectively span a frequency bandwidth, and each physical antenna port supports transmission over the frequency bandwidth and has a per-port transmit power associated therewith. However, for the reference signal transmission, the device allocates the per-port transmit power of each physical antenna port in the group only to frequency elements of the signal that fall within the frequency sub-band associated with the physical antenna port. Correspondingly, the performance module is configured to perform channel estimation based on the reference signal as received at the radio network node. The channel estimation includes interpolating channel estimates within each frequency sub-band based on the reference signal as received in the frequency sub-band, and, when interpolating, optionally accounting for channel changes that may appear at the border between two frequency sub-bands.

In another example, a computer program comprises program instructions which, when executed by at least one processor of a wireless device, cause the wireless device to carry out a method according to the above-described example method at the wireless device.

In another example, a computer program comprises program instructions which, when executed by at least one processor of a radio network node, cause the radio network node to carry out a method according to the above-described example method at the radio network node.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 4 is a diagram of a conventional reference signal transmission.

FIG. 5 is a diagram of one embodiment of performing a reference signal transmission.

FIG. 6 is a diagram of another embodiment of performing a reference signal transmission.

FIG. 7 is a diagram of yet another embodiment of performing a reference signal transmission.

FIG. 8 is a logic flow diagram of one embodiment of a method of signal transmission by a wireless device.

FIG. 9 is a logic flow diagram of one embodiment of a method of channel estimation by a radio network node.

FIG. 10 is a diagram of one embodiment of mapping sequence segments of a reference signal sequence to disjoint frequency segments or sub-bands of a frequency bandwidth, for transmission from respective physical antenna ports.

DETAILED DESCRIPTION

Figure 1:
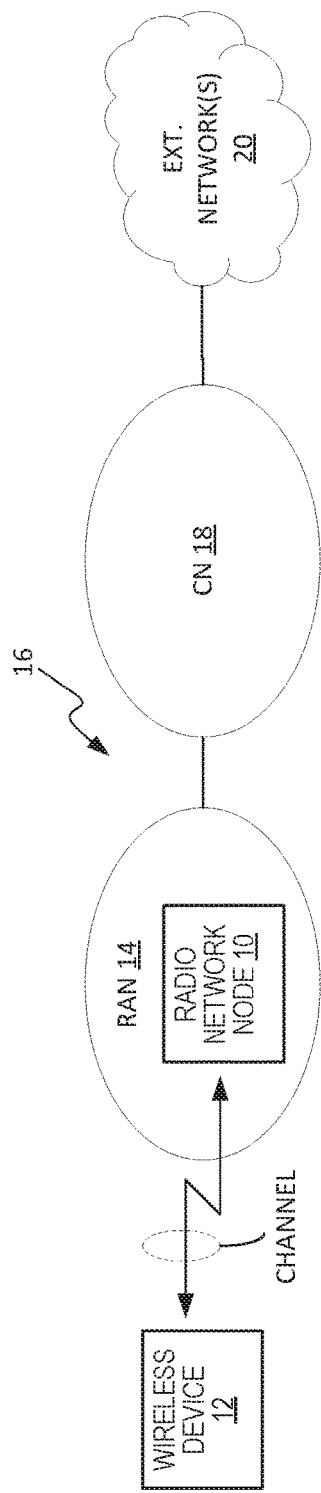
FIG. 1 is a block diagram of one embodiment of a wireless communication network that includes a radio network node communicatively connecting a wireless device to the network.

FIG. 1 illustrates a radio network node 10 that communicatively couples to a wireless device 12 via wireless signaling. The radio network node 10 operates within a Radio Access Network (RAN) 14 that forms part of an example of a wireless communication network 16 ("network 16"). A core network (CN) 18 interfaces to one or more external networks 20, such as the Internet or other Packet Data Networks (PDNs). By way of example, the network 16 may be implemented according to standards promulgated by the Third Generation Partnership Project (3GPP). In such an example, a radio air interface between the wireless device 12 and the radio network node 10 may employ Long Term Evolution (LTE) as the radio technology or may be designed according to the principles of the 5G New Radio (NR) technology. It is noted that the communication between the RAN 14 and the CN 16 can be also wired.

Figure 2:
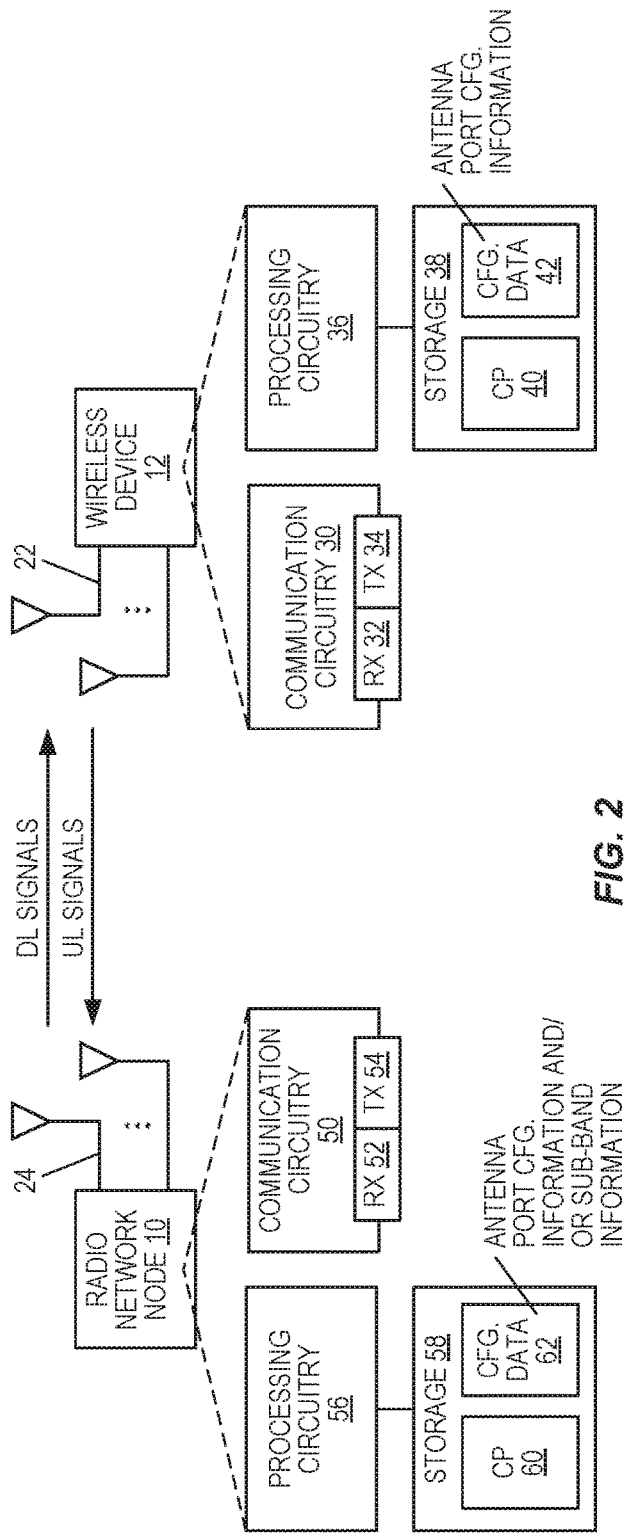
FIG. 2 is a block diagram of one embodiment of a radio network node and a wireless device, such as introduced in FIG. 1.

FIG. 2 illustrates example implementations of the radio network node 10 and wireless device 12. The wireless device 12 includes two or more antennas 22 for performing uplink transmissions to the network 16. Likewise, the radio network node 10 may have multiple antennas 24 for use in receiving uplink transmissions from the wireless device 12 or any number of other devices. In one or more embodiments, the antennas 22 at the wireless device 12 may be used for signal reception, as well as signal transmission. Likewise, in one or more embodiments, the antennas 24 at the radio network node 10 may be used for signal transmission, as well as for signal reception.

In one example, the device 12 is a Machine Type Communication (MTC) device, such as one designed to operate at low power in challenging radio coverage environments. The wireless device 12 may be configured for operation as a NarrowBand Internet of Things (NB-IoT) device. See, for example, the 3GPP document RP-161067, regarding the introduction of NB-IoT features into Release 13 of the 3GPP specifications, also referred to as "LIE Advanced Pro." In other examples, the wireless device 12 comprises another type of 3GPP terminal, often referred to as a "User Equipment" or "UE." More broadly, the wireless device 12 may be fixed or mobile and may comprise a wireless terminal, handset, computer or mobile device, network adaptor, communication dangle, or essentially any other wireless apparatus configured for communication access via the radio interface and protocols supported by the network 16.

In the depicted example, the wireless device 12 includes communication circuitry 30, which provide physical-layer connectivity for transmitting and receiving communication signals. As an example, the communication circuitry 30 includes receiver circuitry 32 and transmitter circuitry 34 configured for cellular or other radio communications, in accordance with the air interface standards and associated signaling protocols used by the network 16. The communication circuitry 30 may include further circuits, e.g., supporting BLUETOOTH, WIFI, or other local connectivity.

Further componentry includes processing circuitry 36, which, in at least some embodiments, includes or is associated with storage 38. The processing circuitry 36 comprises fixed circuitry, programmed circuitry, or a mix of fixed and programmed circuitry. Functionally, the processing circuitry 36 may perform at least some baseband processing associated with transmitting and receiving signals via the communication circuitry 30. The processing circuitry 36 may also be configured to provide overall communication and control processing, etc.

The processing circuitry 36 comprises, for example, one or more microprocessors, digital signal processors, application specific integrated circuits, field programmable gate arrays, or other digital processing circuits. In at least one embodiment, the processing circuitry 36 comprises at least one processor and a memory storing a computer program comprising program instructions for execution by the at least one processor, whereby the at least one processor is configured to cause the wireless device 12 to operate as described herein.

Thus, the storage 38 may comprise one or more types of computer-readable memory providing non-transitory storage for a computer program 40 (abbreviated in FIG. 2 as "CP"), for execution by a processor of the wireless device 12. The storage 38 may store other information, such as one or more items of configuration data 42 (abbreviated in FIG. 2 as "CFG. DATA"). The configuration data 42 may include antenna port configuration information (abbreviated in FIG. 2 as "ANTENNA PORT CFG. INFORMATION"). Notably, "non-transitory" does not necessarily mean permanent or unchanging storage, but does connote storage of at least some persistence. In this regard, the storage 38 may include program memory or storage and working memory or storage, with the former being non-volatile and the latter being volatile. Non-limiting examples include any one or more of FLASH, EEPROM, SRAM, and DRAM circuitry and/or electromagnetic or solid-state disk storage.

Similar details apply to the radio network node 10, although it may have considerably more complexity and operate at higher power as compared to the wireless device 12, and it may include various computer or network interfaces not seen in the wireless device 12, for interfacing with other nodes or systems in the network 16. Broadly, however, the radio network node 10 includes communication circuitry 50, which provides physical-layer connectivity for transmitting and receiving communication signals. As an example, the communication circuitry 50 includes receiver circuitry 52 and transmitter circuitry 54 configured for cellular or other radio communications, in accordance with the air interface standards and associated signaling protocols used by the network 16. Such circuitry may be implemented in resource pools or other plural configurations for use in supporting connections and associated processing for relatively large numbers of devices.

Further componentry includes processing circuitry 56, which, in at least some embodiments, includes or is associated with storage 58. The processing circuitry 56 comprises fixed circuitry, programmed circuitry, or a mix of fixed and programmed circuitry. Functionally, the processing circuitry 56 may perform at least some baseband processing associated with transmitting and receiving signals via the communication circuitry 50. The processing circuitry 56 may also be configured to provide overall communication and control processing, etc.

The processing circuitry 56 comprises, for example, one or more microprocessors, digital signal processors, application specific integrated circuits, field programmable gate arrays, or other digital processing circuits. In at least one embodiment, the processing circuitry 56 comprises at least one processor and a memory storing a computer program comprising program instructions for execution by the at least one processor, whereby the at least one processor is configured to cause the radio network node 10 to operate as described herein.

Thus, the storage 58 comprises one or more types of computer-readable memory providing non-transitory storage for a computer program 60 (abbreviated in FIG. 2 as "CP."), for execution by a processor of the radio network node 10. The storage 58 may store other information, such as one or more items of configuration data 62 (abbreviated in FIG. 2 as "CFG. DATA"). The configuration data. 62 may include antenna port configuration information (ANTENNA PORT CFG. INFORMATION) for the wireless device 12, which radio network node 10 may receive from the wireless device 12, or may derive. Additionally, or alternatively, the radio network node 10 stores sub-band information (SUB-BAND INFORMATION) in the storage 58. That is, it is enough for the radio network node 10 to know the frequency sub-band divisions being used, or to be used by the wireless device 12, for making one or more transmissions to the radio network node 10.

Notably, "non-transitory" does not necessarily mean permanent or unchanging, but does connote storage of at least some persistence. In this regard, the storage 58 may include program memory or storage and working memory or storage, with the former being non-volatile and the latter being volatile. Non-limiting examples include any one or more of FLASH, EEPROM, SRAM, and DRAM circuitry and/or electromagnetic or solid-state disk storage.

In the above description, and elsewhere in the specification, references to items, entities, or components in the singular do not exclude the possibility of plural implementations, unless noted. For example, references to "a processor" are not limited to single-processor implementations and broadly encompass implementations using plural processors operating cooperatively for various ones of the involved functions. Similarly, references to "a node", such as "the radio network node 10", do not exclude multi-node or distributed implementations.

Figure 3:
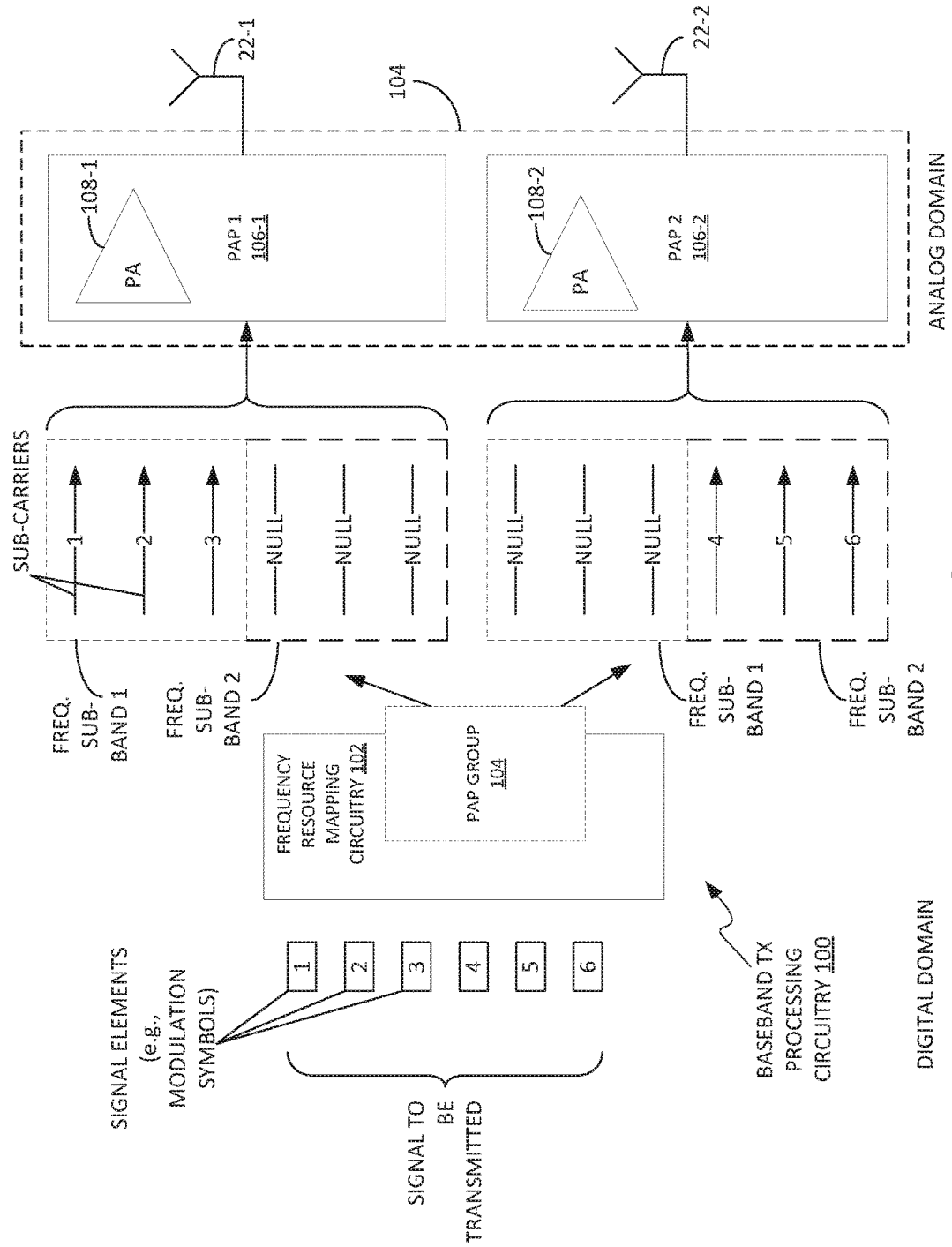
FIG. 3 is a block diagram of one embodiment of logical and physical transmission circuitry, and associated physical antenna ports, such as may be implemented in a wireless device.

Concerning FIG. 3, the processing circuitry 36 includes baseband transmit (TX) processing circuitry 100, which includes frequency resource mapping circuitry 102 that is configured to form a logical group 104 of physical antenna ports 106, for advantageous use when transmitting signals. Here, the physical antenna ports 106 are provided by or in association with the communication circuitry 30 of the wireless device 12, and while only two physical antenna ports 106-1 and 106-2 are shown, the wireless device 12 may have more, e.g., four physical antenna ports 106.

Here, it will be appreciated that a "physical antenna port" 106 has a direct physical association with a corresponding antenna 22 or antennas 22 at the device 12. In the diagram, the physical antenna port 106-1 corresponds to the antenna 22-1, and the physical antenna port 106-2 corresponds to the antenna 22-2. Further, each physical antenna port 106 is associated with certain transmit power resources, e.g., each physical antenna port 106 is associated with a corresponding power amplifier (PA) 108, that provides a per-port transmit power for transmitting from the associated antenna 22.

As a general proposition, each physical antenna port 106 supports transmission across a frequency bandwidth. Here, the frequency bandwidth may be the "system" bandwidth, e.g., the bandwidth configured for use on the uplink between the wireless device 12 and the radio network node 10, or another bandwidth of interest, such as the bandwidth of a signal to be transmitted. However, by operating two or more physical antenna ports 106 as a group 104, rather than individually, the wireless device 12 uses the per-port transmit power of each physical antenna port 106 only for a restricted portion of the frequency bandwidth, which increases the power spectral density of the signal.

In more detail, the processing circuitry 36 of the wireless device 12 is configured to transmit a signal simultaneously from a group 104 of physical antenna ports 106 provided by the communication circuitry (30), based on associating disjoint frequency sub-bands with respective ones of the physical antenna ports 106. The frequency sub-bands collectively span a frequency bandwidth, and each physical antenna port 106 supports transmission over the frequency bandwidth and has a per-port transmit power associated therewith. The processing circuitry 36 "allocates" the per-port transmit power of each physical antenna port 106 in the group 104 only to frequency elements of the signal that fall within the frequency sub-band associated with the physical antenna port 106. Here, it should be noted that a signal can be characterized in the time or frequency domain, and signal components in the frequency domain are referred to as "frequency elements". In the context of Orthogonal Frequency Division Multiplex (OFDM), the frequency elements of a signal correspond to subcarrier frequencies within an OFDM carrier.

Taking the non-limiting and simplified example case depicted in FIG. 3, a signal to be transmitted is formed from six modulation symbols intended for distribution across the frequency bandwidth. Rather than transmitting the "full" signal from an individual one or ones of the physical antenna ports 106—i.e., rather than making a full bandwidth transmission—the wireless device 12 transmits a portion of the signal frequency elements the collectively comprise the signal from each of the physical antenna ports 106 in the group 104.

The frequency resource mapping circuitry 102 "allocates" the per-port transmit power of the physical antenna port 106-1 only to those signal frequency elements that fall within the frequency sub-band (SUB-BAND 1) that has been logically associated with the physical antenna port 106-1. Those frequency elements of the signal that fall outside of SUB-BAND 1 are allocated zero transmit power for the physical antenna port 106-1. Similar power allocations are made for the physical antenna port antenna port 106-2, which is associated with SUB-BAND 2. Consequently, the physical antenna port 106-1 transmits the frequency elements of the signal falling within SUB-BAND 1, and the physical antenna port 106-2 simultaneously transmits signal frequency elements falling within SUB-BAND 2.

The above-described allocation of the per-port transmit power of each physical antenna port 106 in a group 104 only to frequency elements of the signal that fall within the frequency sub-band associated with the physical antenna port 106 can be understood as an implicit or indirect allocation. That is, when assigning modulation symbols to resource elements, and with respect to a given physical antenna port 106 and its associated frequency sub-band, the frequency resource mapping circuitry 102 allocates no symbols to resource elements outside of the associated frequency sub-band. This can be seen equivalently as allocating zero-power symbols to resource elements on frequencies outside of the associated frequency sub-band.

In at least one embodiment, the processing circuitry 36 is configured to form the group 104 of physical antenna ports 106 in response to determining that network coverage conditions at the wireless device 12 are below a certain coverage level. For example, under good network coverage conditions, e.g., where path loss between the wireless device 12 and the radio network node 10 is above a certain threshold, the wireless device 12 may operate its physical antenna ports 106 without grouping. Such operation allows the wireless device 12 to engage in beamforming, multi-layered transmissions, etc., when coverage conditions permit.

In at least some embodiments, the processing circuitry 36 is configured to decide, in dependence on the network coverage conditions, how many groups 104 of physical antenna ports 106 to form, each such group 104 being operated in like manner, including allocating the per-port transmit power of each physical antenna port 106 in each group 104 only to frequency elements of a given signal being transmitted from the group 104 of physical antenna ports 106 that fall within the frequency sub-band associated with the physical antenna port 106. For example, assuming the wireless device 12 has four physical antenna ports 106, the processing circuitry 36 may operate without any groups 104 under good network coverage conditions, and may switch to using two antenna groups 104 of two physical antenna ports 106 per group under moderately poor network coverage conditions, and may switch to using one group 104 that includes all four physical antenna ports 106 under very poor network coverage conditions. Here, "good", "moderately poor", and "very poor" may be understood in a relative sense, and may correspond to defined ranges of received signal strength or quality, such as may be measured by the radio network node 10 and/or the wireless device 10 on defined reference signals.

Thus, under certain conditions or in certain operating modes which may be employed by the wireless device 12 taking into account the certain network conditions, the wireless device 12 may use one or more groups 104 of physical antenna ports 106. However, wider certain other conditions or in certain other modes, the processing circuitry 36 is configured to operate the physical antenna ports 106 individually rather than as a group 104, such that the per-port transmit power of each physical antenna port 106 is available for transmission across the frequency bandwidth. Of course, in other embodiments, the processing circuitry 36 is configured to operate with at least one group 104 of physical antenna ports 106 at all times, e.g., according to preconfigured settings. Other possibilities include static or semi-static arrangements, wherein the wireless device 12 and/or the radio network node 10 decide on whether to operate with grouping and the grouping configuration to use when initially establishing a connection to each other—e.g., as part of Radio Resource Configuration (RRC) signaling at connection establishment.

In any case, in one or more embodiments, the processing circuitry 36 is configured to decide the number of frequency sub-bands or, equivalently, decide the number of physical antenna ports 106 to group together, both being in dependence on the network coverage conditions at the wireless device 12. In at least one embodiment, the processing circuitry 36 is configured to control the relative sizing of the frequency sub-bands or the number of frequency elements of the signal that each physical antenna port 106 in the group 104 is responsible for transmitting, both being in dependence on comparing channel conditions relating the respective physical antenna ports 106 to a radio network node 10 in the wireless communication network 16. In at least one embodiment, the processing circuitry 36 is configured to control the relative sizing of the frequency sub-bands or the number of frequency elements of the signal that each physical antenna port 106 of the group 104 is responsible for transmitting, to reduce variation in power spectral density across the frequency sub-bands, for the signal as received at the radio network node 10. For example, the "effective channel" arising from the use of grouped physical antenna ports 106 reflects differences arising from the use of disjoint frequency sub-bands for transmitting portions of the signal from different physical antenna ports 106. It may be that transmission characteristics of the respective transmitter circuitry at the wireless device 12 is not uniform across the frequency sub-bands, or it may be that channel conditions vary across the frequency sub-bands—e.g., frequency-selective path loss or other variabilities. For example, the processing circuitry 36 may be configured to estimate a "link budget" across the frequency bandwidth, or it may receive link budget information from the radio network node 10. Here, "link budget" refers to the actual or expected received signal power at a remote receiver 10, in view of transmit power and any corresponding gains or losses. Losses include but are not limited to path losses. In either case, the link budget may indicate that certain portions of the frequency bandwidth are more favorable or less favorable than others, and the processing circuitry 36 may use larger frequency sub-bands in the favorable regions and smaller frequency sub-bands in the unfavorable regions.

In at least one embodiment, the processing circuitry 36 is configured to control the relative sizing of the frequency sub-bands, to reduce variation in power spectral density across the frequency sub-bands, for the signal as received at the radio network node 10. For example, the processing circuitry 36 sizes the frequency sub-bands based on calculations or estimates of the received power spectral density per frequency sub-band at the radio network node 10.

In at least some embodiments, the processing circuitry 36 is configured to transmit a reference signal as the signal being transmitted from the group 104 of physical antenna ports 106, for estimation by a radio network node 10 in the wireless communication network 16 of an effective channel associated with the group 104 of physical antenna ports 106. The reference signal is comprised of frequency elements distributed over the frequency bandwidth.

In at least one such embodiment, the processing circuitry 36 is configured to transmit a data signal from a group 104 of physical antenna ports 106 using the same configuration of frequency sub-bands as was used for transmission of the reference signal, so that channel estimation performed at the radio network node 10 based on reception of the reference signal is relevant for reception of the data signal at the radio network node 10.

FIG. 4 illustrates one example of conventional reference signal transmission, involving four physical antenna ports 106, denoted as PAP1, PAP2, and so on. Each physical antenna port 106 transmits a respective sounding reference signal (SRS) over the frequency range of interest, where each SRS comprises values in a defined sequence. In the simplified illustration, for example, a first SRS (SRS1) is transmitted from PAP1, while second SRS (SRS2) of the same length is transmitted from PAP2, and so on. An SRS is composed of a sequence of elements, where each element in the sequence is typically complex valued and is related to the other elements in the sequence in a specific way. These sequence elements are mapped to resource elements along the frequency domain, resulting in SRS frequency elements. SRS may be generated using Zadoff-Chu sequences, for example, such as is defined in the Long Term Evolution (LTE) specifications.

Now contrast the approach depicted in FIG. 5, which provides one example embodiment of reference signal transmission as contemplated herein. The four physical antenna ports 106 used in FIG. 4 for transmitting four SRSs, one SRS per physical antenna port 106, are now logically grouped into two PAP groups 104-1 and 104-2. The group 104-1 includes PAP1 and PAP2, and the group 104-2 includes PAP3 and PAP4.

Rather than transmitting four SRSs, a first SRS, SRS1, is transmitted from PAP1 and PAP2 in the group 104-1, and a second SRS, SRS2, is transmitted front PAP3 and PAP4 in the group 104-2. In particular, in the group 104-1, PAP1 transmits those frequency elements of SRS1 that fall within the frequency sub-band associated with PAP1, and PAP2 simultaneously transmits those frequency elements of SRS1 that fall within the frequency sub-band associated with PAP2. The same scheme applies to the group 104-2, and the transmission of SRS2 by PAP3 and PAP4. Note that FIG. 5 depicts the SRSs as comprising resource elements "RESOURCE ELEMENTS". It is well known that a resource element comprises a particular frequency resource at a given transmit symbol time, e.g., a particular OFDM subcarrier taken at a particular OFDM symbol transmission time.

FIG. 6 depicts the same four physical antenna ports 106—PAP1 through PAP4—arranged as a single group 104. With this arrangement, a single SRS, SRS1, is transmitted from the group 104, based on splitting the SRS across all four PAPs 1-PAP4 in accordance with the defined frequency sub-band associations. It will be appreciated that an example wireless device 12 having at least four physical antenna ports 106 may be configured to perform SRS transmission according to the scheme depicted in FIG. 4 and at least one of FIGS. 5 and 6. For example, the configuration shown in FIG. 4 may be a default or normal mode of operation, whereas the configuration shown in FIG. 5 or 6 may be adopted on a triggered basis, or the device 12 may be configured either by the network 16 or before deployment to use the configuration of FIG. 5 or 6. Further, the device 12 may switch between the different configurations in dependence on network control and/or its own assessment of coverage conditions.

FIG. 7 depicts another example configuration that may be used on a static or dynamic basis by the wireless device 12. Here, two physical antenna ports 106, PAP1 and PAP2, are grouped logically to form a single group 104. However, the frequency bandwidth is divided into unequally sized frequency sub-bands e.g., SUB-BAND 1 is larger (wider) than SUB-BAND 2. Consequently, assuming that the signal to be transmitted is based on a uniform distribution of frequency elements across the frequency bandwidth, PAP1 is responsible for transmitting more frequency elements than PAP2. Such an arrangement may be useful in cases where PAP1 is more capable than PAP2, e.g., has more power, or in cases where certain regions of the frequency bandwidth are associated with better channel conditions than other regions.

With the above approach, a physical antenna port 106 having a relatively bad link budget may be allocated a smaller frequency sub-band as compared to a physical antenna port having a relatively good link budget. As one example, the frequency sub-bands may be sized with an aim towards achieving a uniform received power spectral density at the remote receiver 10 across the disjoint frequency sub-bands. The wireless device 12, for example, estimates path loss on the uplink using its estimates of path loss on the downlink, or it may receive uplink path loss information from the radio network node 10. In any case, decreasing the bandwidth over which a given physical antenna port 106 must operate increases the power per Hz, i.e., increase the power spectral density, by allocating the per-port power of the physical antenna port 106 to a smaller portion of the frequency bandwidth.

In at least some embodiments, the processing circuitry 36 is configured to estimate channel conditions associated with respective ones of the two or more physical antenna ports 106 used for a reference signal transmission, based on received-signal characteristics determined for signals received on the two or more physical antenna ports 106. Correspondingly, the processing circuitry 36 determines any one or more of the number of physical antenna ports 106 to group, which physical antenna ports 106 to group, the number of groups 104 to form, and the relative sizes of the frequency sub-bands to be associated with the physical antenna ports 106 in a group 104.

Broadly, a wireless device 12 according to the teachings herein is configured to transmit a signal simultaneously from a group 104 of physical antenna ports 106 at the wireless device 12, based on associating disjoint frequency sub-bands with respective ones of the physical antenna ports 106. The frequency sub-bands collectively span a frequency bandwidth, and each physical antenna port 106 supports transmission over the frequency bandwidth and has a per-port transmit power associated therewith, and wireless device 12 allocates the per-port transmit power of each physical antenna port 106 in the group 104 only to frequency elements of the signal that fall within the frequency sub-band associated with the physical antenna port 104.

FIG. 8 illustrates a method 800 performed by a the wireless device 12 configured for operation in a network 16. The method 800 comprises transmitting (Block 802) a signal simultaneously from a group 104 of physical antenna ports 106 at the wireless device 12, based on associating (Block 804) disjoint frequency sub-bands with respective ones of the physical antenna ports 106. The frequency sub-bands collectively span a frequency bandwidth and each physical antenna port 106 supports transmission over the frequency bandwidth and has a per-port transmit power associated therewith, and allocating (Blocks 806-1 through 806-N, assuming N physical antenna ports 106 in a group 104) the per-port transmit power of each physical antenna port 106 in the group only to frequency elements of the signal that fall within the frequency sub-band associated with the physical antenna port 106.

On the network side, an example radio network node 10 includes communication circuitry 50 configured for transmitting and receiving signals in a wireless communication network 16, and processing circuitry 56 that is operatively associated with the communication circuitry 50. The processing circuitry 56 is configured to receive a reference signal simultaneously transmitted by a wireless device 12 from a group 104 of physical antenna ports 106 at the wireless device 12, based on the wireless device 12 associating disjoint frequency sub-bands with respective ones of the physical antenna ports 106. The frequency sub-bands collectively span a frequency bandwidth, and each physical antenna port 106 supports transmission over the frequency bandwidth and has a per-port transmit power associated therewith, and the wireless device 12 allocates the per-port transmit power of each physical antenna port 106 in the group 104 only to frequency elements of the signal that fall within the frequency sub-band associated with the physical antenna port 106.

The processing circuitry 56 is further configured to perform channel estimation based on the reference signal as received at the radio network node 10 via the communication circuitry 50. The channel estimation includes interpolating channel estimates within each frequency sub-band based on the reference signal as received in the frequency sub-band, and, when interpolating, optionally accounting for channel changes that may appear at the border between two frequency sub-bands. That is, the processing circuitry 56 is configured to account for the segmentation of the reference signal across the frequency sub-bands within the frequency bandwidth, which segmentation arises from the manner in which the wireless device 12 transmitted the reference signal using individual physical antenna ports 106 within a group 104 of physical antenna ports 106 for transmitting in the respective frequency sub-bands.

In at least one embodiment, the processing circuitry 56 is configured to determine the frequency sub-bands used by the wireless device 12 for transmitting the reference signal, based on receiving information from the wireless device 12 indicating the frequency sub-bands. For example, the information comprises configuration information identifying the frequency sub-bands associated with respective ones of the physical antenna ports 106 operated by the wireless device 12 as a group 104 of physical antenna ports 106. If the device 12 uses more than one group 104, the configuration information includes sub-band information for each group, at least to the extent that two or more groups 104 do not have the same sub-band configurations. In at least one embodiment, the configuration information indicates reference signal configurations (i.e. a configuration of the reference signal), e.g., which reference signal sequence or sequences are being used to generate reference signals that are transmitted from the group 104 of physical antenna ports 106.

In at least some embodiments, for performing the channel estimation, the processing circuitry 56 is configured to detect the frequency sub-bands into which the wireless device 12 divided the frequency bandwidth for transmission of the reference signal, based on evaluating channel estimates determined from the reference signal as received at the radio network node 10, or determined from one or more earlier reference-signal receptions. That is, rather than relying on configuration information from the device 12, the processing circuitry 56 is configured to detect the frequency sub-bands from the channel estimates, e.g., by recognizing step changes, jumps, or other discontinuities arising in the channel estimates across the frequency bandwidth. For example, the frequency-dependent channel estimates made on respective frequency elements of a received reference signal may exhibit a significant change at the frequency sub-band boundaries, and these discontinuities may be recognized by the processing circuitry 56 as corresponding to frequency sub-band boundaries.

The processing circuitry 56 may account for the channel differences associated with the respective physical antenna ports 106 being operated as a group at the device 12, based on limiting the width in frequency of any interpolating filters used for interpolating channel estimates between or over frequencies involving the different physical antenna ports 106. As another alternative, the radio network node 10 does not interpolate channel estimates across the frequency boundaries between the disjoint frequency sub-bands. Other accommodations may be used in other embodiments.

In at least some embodiment, the processing circuitry 56 is further configured to use channel estimates obtained by performing the channel estimation, for receiving a data signal transmitted by the wireless device from the group 104 of physical antenna ports 106 according to a same configuration of frequency sub-bands as was used for transmission of the reference signal. Using such channel estimates for data reception means, e.g., applying the channel estimates determined for a given frequency sub-band to frequency elements of the data signal that fall within that same frequency sub-band. Of course, the data signal transmission may include further reference signal components, e.g., DeModulation Reference Symbols, DMRS, and the processing circuitry 56 may adjust or revise the channel estimates it uses for data reception in dependence on any such further reference signal components embedded in the data transmission.

Broadly, in at least one embodiment, a radio network node 10 is configured to receive a reference signal simultaneously transmitted by a wireless device 12 from a group 104 of physical antenna ports 106 at the wireless device 12, based on the wireless device 12 associating disjoint frequency sub-bands with respective ones of the physical antenna ports 106. The frequency sub-bands collectively span a frequency bandwidth, and each physical antenna port 106 supports transmission over the frequency bandwidth and has a per-port transmit power associated therewith, and the wireless device 12 allocates the per-port transmit power of each physical antenna port 106 in the group 104 only to frequency elements of the signal that fall within the frequency sub-band associated with the physical antenna port 106. The radio network node 10 is further configured to perform channel estimation based on the reference signal as received at the radio network node 10. The channel estimation includes interpolating channel estimates within each frequency sub-band based on the reference signal as received in the frequency sub-band, and, when interpolating, optionally accounting for channel changes that may appear at the border between two frequency sub-bands.

FIG. 9 illustrates an example method 900 performed by a radio network node 10. The method 900 includes the radio network node 10 receiving (Block 902) a reference signal simultaneously transmitted by a wireless device 12 from a group 104 of physical antenna ports 106 at the wireless device 12, based on the wireless device 12 associating disjoint frequency sub-bands with respective ones of the physical antenna ports 106. The frequency sub-bands collectively span a frequency bandwidth, and each physical antenna port 106 supports transmission over the frequency bandwidth and has a per-port transmit power associated therewith, and the wireless device 12 allocates the per-port transmit power of each physical antenna port 106 in the group 104 only to frequency elements of the signal that fall within the frequency sub-hand associated with the physical antenna port 106.

The method 900 further includes the radio network node 10 performing (Block 904) channel estimation based on the reference signal as received at the radio network node 10. The channel estimation includes interpolating channel estimates within each frequency sub-band based on the reference signal as received in the frequency sub-band, and, when interpolating, optionally accounting for channel changes that may appear at the border between two frequency sub-bands.

FIG. 10 illustrates one example of transmitting a signal, a reference signal, from a group 104 of antenna ports 106. The signal is divided into two segments. For example, the signal is a sounding reference signal generated by an M-length Zadoff-Chu sequence. A first portion of the signal frequency elements of the signal is denoted as SIGNAL SEGMENT 1, corresponding to a first frequency sub-band denoted as FREQUENCY SUB-BAND 1. Likewise, a second, remaining portion of the frequency elements of the signal are denoted as SIGNAL SEGMENT 2 and correspond to a second frequency sub-band denoted as FREQUENCY SUB-BAND 2. Such an arrangement may be used to split a sounding reference signal across frequency sub-bands.

In a contemplated variation, rather than splitting the signal across the frequency bands, each signal frequency element for transmission in each frequency sub-band may be generated using shorter generator sequences corresponding to respective ones of the frequency sub-bands. For example, rather than dividing an M-length generator sequence into N segments corresponding to N physical antenna ports 106, for generation of an SRS, the SRS may be generated using N shorter sequences.

Figure 11:
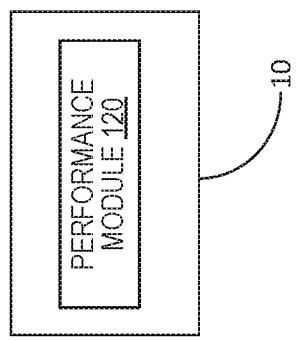
FIG. 11 is a block diagram of one embodiment of modules, as may be implemented in a radio network node.

FIG. 11 illustrates another embodiment of a radio network node 10, comprising a performance module 120. The performance module 120 is configured to receive a reference signal simultaneously transmitted by a wireless device 12 from a group 104 of physical antenna ports 106 at the wireless device 12, based on the wireless device 12 associating disjoint frequency sub-bands with respective ones of the physical antenna ports 106. The frequency sub-bands collectively span a frequency bandwidth, and each physical antenna port 106 supports transmission over the frequency bandwidth and has a per-port transmit power associated therewith, and the wireless device 12 allocates the per-port transmit power of each physical antenna port 106 in the group 104 only to frequency elements of the signal that fall within the frequency sub-band associated with the physical antenna port 106.

The performance module 120 is further configured to perform channel estimation based on the reference signal as received at the radio network node 10. The channel estimation includes interpolating channel estimates within each frequency sub-hand based on the reference signal as received in the frequency sub-band, and, when interpolating, optionally accounting for channel changes that may appear at the border between two frequency sub-bands.

The radio network node 10 may include one or more further modules to perform a method according to any of the examples disclosed herein for a radio network node 10. It is also contemplated herein to provide a computer program, e.g., CP 60 in FIG. 1, comprising program instructions which, when executed by at least one processor of a radio network node 10, cause the radio network node 10 to carry out any of the methods disclosed herein for a radio network node 10.

Figure 12:
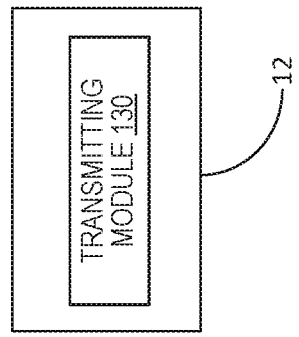
FIG. 12 is a block diagram of one embodiment of modules, as may be implemented in a wireless device.

FIG. 12 illustrates an example embodiment of a wireless device 12 comprising a transmitting module 130. The transmitting module 130 is configured to transmit a signal simultaneously from a group 104 of physical antenna ports 106 at the wireless device 12, based on associating disjoint frequency sub-bands with respective ones of the physical antenna ports 106. The frequency sub-hands collectively span a frequency bandwidth, and each physical antenna port 106 supports transmission over the frequency bandwidth and has a per-port transmit power associated therewith. The transmitting module 130 allocates the per-port transmit power of each physical antenna port 106 in the group 104 only to frequency elements of the signal that fall within the frequency sub-band associated with the physical antenna port 106.

The wireless device 12 may include one or more further modules to perform any of the device-side methods disclosed herein. It is also contemplated to provide a computer program, e.g., CP 40 of FIG. 1, comprising program instructions which, when executed by at least one processor of a wireless device 12, cause the wireless device 12 to carry out any of the device-side methods disclosed herein.

Operating physical antenna ports 106 together as a group 104, as disclosed herein, mean that the power available on a per-physical-antenna-port basis at the wireless device 12 is shared or divided over a smaller bandwidth, as compared to using the involved physical antenna port 106 for transmitting over the full bandwidth. Further, by using disjoint frequency sub-bands for the respective physical antenna ports 106 in the group 104, such operations also avoid any undesired beamforming that might otherwise arise if two or more physical antenna ports 106 simultaneously transmitted the same signal in the same frequency band(s).

Therefore, the described mechanisms easily and efficiently enable the receiving radio network node 10 to receive signal transmissions from the wireless device 12 at power spectral densities sufficient for accurate channel estimation and/or data reception. While not so limited, the device-side and network-side methods and apparatuses disclosed herein may have particular advantages for networks 16 that use higher transmission frequencies, e.g., 2 GHz or above. Evolving network technologies, like the New Radio (NR) aspects of 5G radio networks contemplate the use of higher transmission frequencies, e.g., millimeter wave transmissions.

It should be appreciated that the disclosed techniques apply for a range or variety of types of signal transmissions. Examples include the transmission of demodulation reference signals sent with or without accompanying data. As such, the broader technique is to subdivide a frequency bandwidth into frequency sub-bands and allocate respective frequency sub-bands to different physical antenna ports 106, which are then operated together as a logical group 104. Such operation uses the power available for transmission from each physical antenna port 106 only for transmitting in a unique or disjoint frequency sub-band of the frequency bandwidth, while simultaneously avoiding undesired beamforming that could arise if the per-physical-antenna-port transmissions overlapped in frequency.

Put simply, the transmission technique disclosed herein increases the power spectral density of the transmitted signals, based on using two or more physical antenna ports 106 and the respective power amplifiers 108 simultaneously for an overall reference signal transmission, while restricting each PA 108 to amplify only those signal frequency elements falling into a unique frequency sub-band within the frequency bandwidth. As a further advantage, the increased power spectral density is achieved in one transmission instance, meaning that the channel estimates made at the remote receiver 10 for the different frequency sub-bands all correspond to the same transmission time.

In cases where the different physical antenna ports 106 are associated with different beam patterns or have different path gains, the wireless device 12 may divide the frequency bandwidth unequally between them, to take advantage of a higher gain or better conditions associated with one physical antenna port 106 versus another one. In a particular example configuration, the processing circuitry 36 of the wireless device 12 is configured to divide the frequency band into non-equal frequency sub-bands, so as to achieve a more constant power spectral density at the remote receiver 10 across the frequency sub-bands.

Assume, for example, a case where one physical antenna port 106 was associated with a higher gain or lower path loss than another one. Using an equal frequency division between two such ports would result in the remote receiver 10 receiving the reference signal from one port with a higher power spectral density as compared to the reference signal received from the other port. The processing circuitry 36 in at least one embodiment is configured to obtain, calculate, or otherwise determine the differences in channels, beam gains, or overall link budgets, as between two or more physical antenna ports 106 and use the differences to calculate or select the bandwidths of the frequency sub-bands used for transmitting from each of the physical antenna ports 106 being operated together as a group 104.

Among other things, the techniques disclosed herein allow for precoded reference signal ports with frequency sub-band preceding. Further, as noted, data transmissions from the wireless device 12 may use the same port-grouping configuration as was used for reference signal transmission, which results in the channel estimate at the remote receiver 10 being relevant for processing the received data.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of operation at a wireless device configured for operation in a wireless communication network, the method comprising:
    transmitting a signal simultaneously from a group of physical antenna ports at the wireless device, based on associating disjoint frequency sub-bands with respective ones of the physical antenna ports, wherein the frequency sub-bands collectively span a frequency bandwidth and each physical antenna port supports transmission over the frequency bandwidth and has a per-port transmit power associated therewith, and allocating the per-port transmit power of each physical antenna port in the group only to frequency elements of the signal that fall within the frequency sub-band associated with the physical antenna port.

2. The method of claim 1, further comprising forming the group of physical antenna ports in response to determining that network coverage conditions at the wireless device are below a certain coverage level.

3. The method of claim 2, further comprising deciding, in dependence on the network coverage conditions, how many groups of physical antenna ports to form, each such group being operated in like manner, including allocating the per-port transmit power of each physical antenna port in each group only to frequency elements of a given signal being transmitted from the group of physical antenna ports that fall within the frequency sub-band associated with the physical antenna port.

4. The method of claim 2, further comprising, during a period before or after forming the group of physical antenna ports, operating the physical antenna ports individually rather than as said group, such that the per-port transmit power of each physical antenna port is available for transmission across the frequency bandwidth.

5. The method of claim 1, further comprising deciding the number of frequency sub-bands or, equivalently, deciding the number of physical antenna ports to group together in the group, in dependence on the network coverage conditions at the wireless device.

6. The method of claim 1, further comprising controlling the relative sizing of the frequency sub-bands or the number of frequency elements of the signal that each physical antenna port of the group is responsible for transmitting, in dependence on comparing channel conditions relating the respective physical antenna ports of the group to a radio network node in the wireless communication network.

7. The method of claim 6, further comprising controlling the relative sizing of the frequency sub-bands or the number of frequency elements of the signal that each physical antenna port of the group is responsible for transmitting, to reduce variation in power spectral density across the frequency sub-bands, for the signal as received at the radio network node.

8. The method of claim 1, wherein transmitting the signal comprises transmitting a reference signal, for estimation by a radio network node in the wireless communication network of an effective channel associated with the group of physical antenna ports, wherein the reference signal is comprised of frequency elements distributed over the frequency bandwidth.

9. The method of claim 8, further comprising transmitting a data signal from the group of physical antenna ports using a same configuration of frequency sub-bands as was used for transmission of the reference signal, so that channel estimation at the radio network node based on reception of the reference signal is relevant for reception of the data signal at the radio network node.

10. A wireless device comprising:
    communication circuitry configured to transmit and receive signals in a wireless communication network; and
    processing circuitry operatively associated with the communication circuitry and configured to transmit a signal simultaneously from a group of physical antenna ports provided by the communication circuitry, based on associating disjoint frequency sub-bands with respective ones of the physical antenna ports, wherein the frequency sub-bands collectively span a frequency bandwidth and each physical antenna port supports transmission over the frequency bandwidth and has a per-port transmit power associated therewith, and allocating the per-port transmit power of each physical antenna port in the group only to frequency elements of the signal that fall within the frequency sub-band associated with the physical antenna port.

11. The wireless device of claim 10, wherein the processing circuitry is configured to form the group of physical antenna ports in response to determining that network coverage conditions at the wireless device are below a certain coverage level.

12. The wireless device of claim 11, wherein the processing circuitry is configured to decide, in dependence on the network coverage conditions, how many groups of physical antenna ports to form, each such group being operated in like manner, including allocating the per-port transmit power of each physical antenna port in each group only to frequency elements of a given signal being transmitted from the group of physical antenna ports that fall within the frequency sub-band associated with the physical antenna port.

13. The wireless device of claim 11, wherein the processing circuitry is configured to operate the physical antenna ports individually rather than as said group, such that the per-port transmit power of each physical antenna port is available for transmission across the frequency bandwidth, at least under certain conditions prevailing during a period before or after the signal is transmitted.

14. The wireless device of claim 10, wherein the processing circuitry is configured to decide the number of frequency sub-bands or, equivalently, decide the number of physical antenna ports to group together, in dependence on the network coverage conditions at the wireless device.

15. The wireless device of claim 10, wherein the processing circuitry is configured to control the relative sizing of the frequency sub-bands or the number of frequency elements of the signal that each physical antenna port in the group is responsible for transmitting, in dependence on comparing channel conditions relating the respective physical antenna ports to a radio network node in the wireless communication network.

16. The wireless device of claim 15, wherein the processing circuitry is configured to control the relative sizing of the frequency sub-bands or the number of frequency elements of the signal that each physical antenna port of the group is responsible for transmitting, to reduce variation in power spectral density across the frequency sub-bands, for the signal as received at the radio network node.

17. The wireless device of claim 10, wherein the processing circuitry is configured to transmit a reference signal as said signal, for estimation by a radio network node in the wireless communication network of an effective channel associated with the group of physical antenna ports, wherein the reference signal is comprised of frequency elements distributed over the frequency bandwidth.

18. The wireless device of claim 17, wherein the processing circuitry is configured to transmit a data signal from the group of physical antenna ports using a same configuration of frequency sub-bands as was used for transmission of the reference signal, so that channel estimation performed at the radio network node based on reception of the reference signal is relevant for reception of the data signal at the radio network node.

19. A method at a radio network node configured for operation in a wireless communication network, the method comprising:
receiving a reference signal simultaneously transmitted by a wireless device from a group of physical antenna ports at the wireless device, based on the wireless device associating disjoint frequency sub-bands with respective ones of the physical antenna ports, wherein the frequency sub-bands collectively span a frequency bandwidth and each physical antenna port supports transmission over the frequency bandwidth and has a per-port transmit power associated therewith, and allocating the per-port transmit power of each physical antenna port in the group only to frequency elements of the signal that fall within the frequency sub-band associated with the physical antenna port; and
performing channel estimation based on the reference signal as received at the radio network node, said channel estimation including interpolating channel estimates within each frequency sub-band based on the reference signal as received in the respective frequency sub-band, and, when interpolating, optionally accounting for channel changes that appear at the border between two frequency sub-bands.

20. The method of claim 19, further comprising determining the frequency sub-bands used by the wireless device for transmitting the reference signal, based on receiving information from the wireless device indicating the frequency sub-bands.

21. The method of claim 20, wherein the information comprises configuration information identifying the frequency sub-bands associated with respective ones of the physical antenna ports operated by the wireless device as said group of physical antenna ports.

22. The method of claim 19, wherein performing the channel estimation includes detecting the frequency sub-bands into which the wireless device divided the frequency bandwidth for transmission of the reference signal, based on evaluating channel estimates determined from the reference signal as received at the radio network node, or determined from one or more earlier reference-signal receptions.

23. The method of claim 19, further comprising using channel estimates obtained by performing the channel estimation, for receiving a data signal transmitted by the wireless device from the group of physical antenna ports according to a same configuration of frequency sub-bands as was used for transmission of the reference signal.

24. A radio network node comprising:
communication circuitry configured for transmitting and receiving signals in a wireless communication network; and
processing circuitry operatively associated with the communication circuitry and configured to:
receive a reference signal simultaneously transmitted by a wireless device from a group of physical antenna ports at the wireless device, based on the wireless device associating disjoint frequency sub-bands with respective ones of the physical antenna ports, wherein the frequency sub-bands collectively span a frequency bandwidth and each physical antenna port supports transmission over the frequency bandwidth and has a per-port transmit power associated therewith, and allocating the per-port transmit power of each physical antenna port in the group only to frequency elements of the signal that fall within the frequency sub-band associated with the physical antenna port; and
perform channel estimation based on the reference signal as received at the radio network node, said channel estimation including interpolating channel estimates within each frequency sub-band based on the reference signal as received in the frequency sub-band, and, when interpolating, optionally accounting for channel changes that appear at the border between two frequency sub-bands.

25. The radio network node of claim 24, wherein the processing circuitry is configured to determine the frequency sub-bands used by the wireless device for transmitting the reference signal, based on receiving information from the wireless device indicating the frequency sub-bands.

26. The radio network node of claim 25, wherein the information comprises configuration information identifying the frequency sub-bands associated with respective ones of the physical antenna ports operated by the wireless device as said group of physical antenna ports.

27. The radio network node of claim 24, wherein, for performing the channel estimation, the processing circuitry is configured to detect the frequency sub-bands into which the wireless device divided the frequency bandwidth for transmission of the reference signal, based on evaluating channel estimates determined from the reference signal as received at the radio network node, or determined from one or more earlier reference-signal receptions.

28. The radio network node of claim 24, wherein the processing circuitry is further configured to use channel estimates obtained by performing the channel estimation, for receiving a data signal transmitted by the wireless device from the group of physical antenna ports according to a same configuration of frequency sub-bands as was used for transmission of the reference signal.

29. A non-transitory computer-readable medium storing a computer program comprising program instructions that, when executed by at least one processor of a wireless device configured for operation in a wireless communication network, cause the wireless device to:
  transmit a signal simultaneously from a group of physical antenna ports at the wireless device, based on associating disjoint frequency sub-bands with respective ones of the physical antenna ports, wherein the frequency sub-bands collectively span a frequency bandwidth and each physical antenna port supports transmission over the frequency bandwidth and has a per-port transmit power associated therewith, and allocating the per-port transmit power of each physical antenna port in the group only to frequency elements of the signal that fall within the frequency sub-band associated with the physical antenna port.

30. A non-transitory computer-readable medium storing a computer program comprising program instructions that, when executed by at least one processor of a radio network node configured for operation in a wireless communication network, cause the radio network node to:
  receive a reference signal simultaneously transmitted by a wireless device from a group of physical antenna ports at the wireless device, based on the wireless device associating disjoint frequency sub-bands with respective ones of the physical antenna ports, wherein the frequency sub-bands collectively span a frequency bandwidth and each physical antenna port supports transmission over the frequency bandwidth and has a per-port transmit power associated therewith, and allocating the per-port transmit power of each physical antenna port in the group only to frequency elements of the signal that fall within the frequency sub-band associated with the physical antenna port; and
  perform channel estimation based on the reference signal as received at the radio network node, said channel estimation including interpolating channel estimates within each frequency sub-band based on the reference signal as received in the respective frequency sub-band, and, when interpolating, optionally accounting for channel changes that appear at the border between two frequency sub-bands.

* * * * *